United States Patent
Nowell (10) Patent No.: US 11,858,689 B2
(45) Date of Patent: Jan. 2, 2024

(54) CONTAINER PACKAGING

(71) Applicant: James Cropper 3D Products Limited, Kendal (GB)

(72) Inventor: Rowan Nowell, Kendal (GB)

(*) Notice: Subject to any disclaimer, the term of this patent is extended or adjusted under 35 U.S.C. 154(b) by 48 days.

(21) Appl. No.: 17/140,769

(22) Filed: Jan. 4, 2021

(65) Prior Publication Data
US 2021/0339908 A1    Nov. 4, 2021

(30) Foreign Application Priority Data

Apr. 30, 2020  (EP) .................................. 20172478

(51) Int. Cl.
| | | |
|---|---|---|
| A61J 9/00 | (2006.01) | |
| B65D 23/08 | (2006.01) | |
| B65B 5/04 | (2006.01) | |
| B65D 81/30 | (2006.01) | |

(52) U.S. Cl.
CPC ............ B65D 23/0885 (2013.01); B65B 5/04 (2013.01); B65D 81/30 (2013.01)

(58) Field of Classification Search
CPC .. B65D 81/30; B65D 23/0885; B65D 23/001; B65B 5/04
USPC ........ 220/592.16, 4.01, 4.21, 4.22; 215/12.1, 215/394, 395
See application file for complete search history.

(56) References Cited

U.S. PATENT DOCUMENTS

| | | | | |
|---|---|---|---|---|
| 1,468,808 | A | * | 9/1923 | Hamilton ............. B65D 23/001 215/12.1 |
| 1,698,510 | A | | 1/1929 | Reutter |
| 4,533,057 | A | * | 8/1985 | Klittich .................... A61J 9/08 215/11.3 |
| 9,908,689 | B2 | * | 3/2018 | Schulz .................. B65D 83/48 |

FOREIGN PATENT DOCUMENTS

| | | |
|---|---|---|
| CA | 2480789 A1 | 3/2006 |
| GB | 752162 A | 7/1956 |

OTHER PUBLICATIONS

Extended European Search Report for priority application No. 20172478.8, dated Oct. 2, 2020.

* cited by examiner

*Primary Examiner* — John K Fristoe, Jr.
*Assistant Examiner* — Elizabeth J Volz
(74) *Attorney, Agent, or Firm* — Egbert, McDaniel & Swartz, PLLC (57) ABSTRACT

There is provided a packaging for a container wherein the packaging is formed from a plurality of shell pieces that are hinged together to wrap around the container. When wrapped around the container, a first shell piece is secured to a second shell piece using a two-point locking feature. The shell pieces are formed with a substantially constant wall thickness such that the packaging substantially conforms to the shape of the container. Thus, advantageously, any distinctiveness in the shape of the container is not lost when wrapped by the packaging.

11 Claims, 7 Drawing Sheets

CONTAINER PACKAGING

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to an improved packaging for a container and particularly, although not exclusively, to a packaging for a bottle or the like.

2. Description of Related Art Including Information Disclosed Under 37 CFR 1.97 and 37 CFR 1.98

Packaging for containers are widely known. The packaging comes in various styles and formats and materials. Generally, the packaging has numerous purposes depending on the container and what product the container is enclosing. For example, the packaging may provide a decorative cover for the product or for carrying additional product information to a purchaser when selecting the container, for example, from a retail outlet. Or the packaging may provide protection for the container during transport or within the retail environment. Or the packaging may provide a convenient shape for handling or transportation of the container. One driver behind general packaging developments is environmental considerations being driven by producers, retailers and consumers. Some of the environmental drivers can be categorised as using less packaging and using packaging that is recycled or can be recycled.

One type of container is a bottle or the like for containing liquid. The bottle can be, for example, a plastic bottle or a glass bottle, typically closed with a closure at the top. Because these materials can be transparent, or at least translucent, as well as the above general considerations, liquid containers can also serve a requirement of protecting the liquid from the external environment. For example, for protecting the liquid from being degraded through exposure to external light. This is particularly important in the drink market, for products such as fruit juices and wine that can degrade when exposed to sunlight and other sources of ultra violet rays.

Herein, the exemplary embodiments are described in relation to a wine bottle and in particular to a wine bottle suitable for holding champagne. However, it will be appreciated that the packaging will be suitable for any wine bottle, and in deed any container. Thus, whilst a wine bottle is described for exemplary purposes, it will be appreciated that the packaging could be adapted to fit any design of bottle or other type of container by appropriately altering the dimensions, size and shape of the packaging. By way of example, a wine bottle is formed from glass and filled with the champagne product and finally sealed with a cork and typically a wire covering. Labels can be applied to the bottle as is generally known in the art. Before reaching the retail environment, the bottle can be packaged into a cardboard packaging. For example a rectangular box. The rectangular box has an opening through which the bottle can enter the packaging. In one example, the opening is provide at a top end of the rectangular box. The bottle is slid into the box base first so that the cork end of the bottle is nearest the opening. Because the bottle has a generally circular cross-section, spaces are present at the corners of the box between the packaging and bottle. The opening is typically closed by a flap and tab to secure the bottle inside the box. Many adaptions and additions to the box design are known. For example whilst rectangular boxes are used, square presentation boxes can be used, and tubes with lids are also known, in particular in the spirits industry.

The present invention has been devised in light of the above considerations. For instance, it is an aim to provide a packaging for a container that uses reduced material. It is a further or alternative aim to provide a packaging for a container that can be formed from recycled material. It is a further or alternative aim to provide a packaging for a container that maintains a container's distinctiveness in the retail environment.

BRIEF SUMMARY OF THE INVENTION

According to one aspect there is provided a packaging for a container wherein the packaging is formed from a plurality of shell pieces that are hinged together to wrap around the container. When wrapped around the container, a first shell piece is secured to a second shell piece using a two-point locking feature. The shell pieces are formed with a substantially constant wall thickness such that the packaging substantially conforms to the shape of the container. Thus, advantageously, any distinctiveness in the shape of the container is not lost when wrapped by the packaging.

One-point of the two-point locking feature is formed by a clasp and catch that engage each other to form a fastening. The fastening can be released to remove the packaging from the container. And preferably, re-engaged to re-secure the packaging around the container. The clasp is provided on the first shell piece and the catch is provided on the second shell piece. The clasp fits over the catch to provide the first point of contact. The first point of contact prevents the first shell part from moving relatively away from the second shell part in at least one direction that would expand the packaging. With the shell pieces sized to fit a style of container having a defined shape, if the container is perfectly sized, the shell pieces can fit snugly around the container and the clasp can be closed over the catch and the packaging held in place by the first point of contact resisting relative movement in the direction that would expand the packaging and contact between the shell pieces and the container would act to prevent the first shell piece moving relatively to the second shell piece in a second direction that would act to contract the packaging. However, although container manufacturers produce containers to a specification, manufacturing tolerances mean that when a plurality of containers are produced, the exact size of the containers can vary. Thus, whilst the packaging may fit snugly around a large tolerance container, on a small tolerance container, the packaging would not fit as snugly. It is also possible that the packaging is produced within a tolerance so that slightly different sizes of packaging are produced providing the same issue. If the packaging does not fit snugly, contact between the packaging and bottle to prevent relative movement of the first and second shell pieces in the second direction does not occur, or at least, does not occur until the first and second shell pieces have moved relatively to each other sufficiently to release the fastening of the clasp and catch.

In order to avoid accidental release of the fastening and therefore accidental removal of the packaging from the container, the packaging provides a second-point of the two point locking feature. Here, the second-point of the two-point locking feature is provided between an abutment between the first and second shell pieces. Advantageously, the abutment between the first and second shell pieces is provided independently of the bottle. Thus, even in the event that the packaging is sized relatively to the bottle such that the first and second shell pieces can move, the second-point of contact resists the movement such that the clasp and catch do not disengage. Accidental disengagement of the clasp and catch is therefore reduced or prevented.

With movement in the two directions resisted, the clasp retains the shell pieces fitted around the container. For instance the clasp and catch may have an inference fit that resists the catch from being disengaged from the latch. Alternatively the packaging includes at least a resilient portion that allows the clasp and catch to push past each other. The resilient portion returning the clasp and catch to require the two parts to push past each other in the reverse to disengage the fastening. In the exemplary embodiments, the clasp and catch engage each other to form a repeatable fastening. The repeatable fasting is engaged and disengaged by relative movement of the clasp and catch. In one exemplary embodiment, the relative movement to engage the fastening is suitably at least in part configured to be in a direction angled to the first or second direction. For instance, suitably in relation to a bottle having a generally annular cross-section, the clasp engages the catch at least in part by a radial movement, whereas the first and second directions of relative movement between the first and second shell pieces to enlarge or contract the packaging is in a tangential direction. Here, the clasp and catch push past each other by resilient movement of one of the parts in the second direction that contracts the packaging. Thus to disengage the fastening, the clasp and catch must be urged to pass each other in the reverse radial direction. Alternatively, the clasp could be moved free of the catch by relative movement of the first and second shells in the second direction to contract the packaging. Here, the clasp and catch would be disengaged without requiring a specific force to urge the two parts to pass each other. However, as explained above, because the second-point of contact between the packaging, and independent of the bottle, resits the movement in the second direction, the clasp and catch are prevented from disengaging without application of the specific force to urge the two parts back past each other.

In on embodiment, the clasp is formed on a flap of the first shell piece. Here, the flap extends to overlap the second shell piece when the shell pieces are arranged to wrap the container. Suitably, the flap is connected to a main body section of the first shell piece via a hinge. The hinge may be termed a flap hinge and would be separate to the main hinge that interconnects the first and second shell pieces. The hinge may be a fold line or the like about which the flap can pivot relative the main body section. Here, the pivoting of the flap relative to the main body section can provide the movement to engage and disengage the catch and latch fastening. Thus, the movement of the catch relative to the latch would be in an arcuate direction about an axis along the hinge. Suitably, the hinge is aligned with an axial direction of the packaging. For instance, in relation to a bottle, in a direction of the central axis from a bottom end of the bottle to a closure or cork end of the bottle.

In the exemplary embodiments, the first-point of contact of the two-point locking feature is provided by abutment between the clasp and catch. Suitably, the catch comprises a projection on the second shell piece. Here, the projection extends from a main body section of the second shell piece. The projection suitably extends at an angle to the first or second relative directions of movement to expand or contract the packaging. For instance, in relation to a bottle, the projection may extend radially. Further, in some embodiments, the projection forms an undercut. Here, the projection has a nose that faces in the first direction. The nose forms an undercut wherein the tip of the nose is formed to be further from a distal edge of the second shell piece than a base of the nose. Thus, as the catch pushes over the nose to engage the fastening, the catch can relax into the undercut. In this arrangement, the undercut provides an enhanced retention of the clasp and catch. In one embodiment, the nose is arranged to be resiliently moved relatively the catch to make the fastening. In these embodiments, the clasp may have a corresponding undercut. Suitably, the clasp may be formed to overlay at least a portion of the catch and preferably at least the nose portion of the catch. In one exemplary embodiment, the clasp overlays the entire catch or substantially the entire catch.

In exemplary embodiments, the second-point of contact of the two-point locking feature is provided by abutment between a portion of the first shell piece and a portion of the second shell piece. Whilst the abutment may be between distal edges of the shell pieces, it is envisaged that the shell pieces will be formed relatively thin, and would thus be susceptible to becoming unaligned if the two parts were not brought together in a good register with each other. Although, the second-point of contact can be improved by increasing the area of the abutment, forming projecting ridges on the distal edges to form an abutting seam may be undesirable in some instances. Thus, preferably, the second-point of contact is improved by overlapping the first and second shell pieces in the area of the abutment. That is, the second abutment is provided by a transition point at which the second shell piece transitions from being overlaid on one side, for instance the outside, of the first shell piece to being laid on the second side, for instance the inside, of the first shell piece. Here, the abutment is provided between the distal edges of the shell pieces, but the abutment is maintained by the overlapping. In the exemplary embodiments, the second shell piece is arranged to lie on the outside of the first shell piece. Here, because the clasp on the first shell piece is arranged to fit over the outside of the catch on the second shell piece, the second point of contact is formed by an abutment between the distal edges of the shell pieces as they cross over, e.g. transition, from being on the outside of the other to being on the inside of the other and vice versa. Here, in the embodiments wherein the clasp is provided on a flap, suitably, the portion of the first shell piece forming the abutment may be arranged to be at or adjacent the hinge that connects the flap to the main body. In one exemplary embodiment, the overlapping portion of the second shell piece is provided to one side of the clasp and catch. In relation to a bottle, the overlapping portion may be provided beneath the clasp and catch relative to the axial direction of the bottle and towards the bottom end. In an alternative embodiment, the overlapping portion may be provided to both sides of the clasp and catch. Here, the first shell piece transitions from being under the second shell piece to being over the second shell piece at a location on either side of the catch, and the second-point of contact is formed at both sides. Here, the two spaced contacts that form the second-point of contact of the two-point locking feature provides some resistance to the shell pieces skewing relative to each other.

In the exemplary embodiments, the packaging fits a container such as a bottle. Typically a bottle comprises a major cylindrical portion, a neck portion in which the stopper or cork is applied and a transition or shoulder portion that connects the major cylindrical portion to the neck. Thus, in exemplary embodiments, suitably, the clasp and catch are provided on the major cylindrical part of the body. Suitably, the overlapping portion of the second shell piece is arranged beneath the clasp and catch and towards a base of the bottle. Here, skew of the first shell part relative to the second shell part and about the second-point of contact can be sufficient to move the clasp and catch out of engagement. Here, preferably the two-point locking feature may include a further point of contact to provide a three-point locking feature. In the exemplary embodiments, the third-point of contact is configured to be provided by abutment between the first and second shell pieces. In the exemplary embodiments, the third-point of contact is provided by abutment between the shell pieces wherein the shell pieces are arranged to transition from overlapping with one part on the outside of the other to that part not overlapping on the outside. For instance, the overlapping could transition to overlap in the alternative configuration on either side of the third-point of contact. However, alternatively, the shell pieces may not overlap on one side of the third-point of contact. Here, suitably, the third-point of contact between the first and second shell pieces can be provided spaced from the second-point of contact. The third-point of contact is suitably provided on the other side of the clasp and catch to the second-point of contact. In particular, in relation to the packaging fitting a bottle, the second-point of contact may be arranged towards a base of the bottle and on the major cylindrical part of the bottle, and suitably on a lower portion of the major cylindrical part of the bottle. Here, the third-point of contact is suitably provided on the transition portion or on or around the neck of the bottle. With a substantial spacing between the second-point of contact and the third-point of contact, the third-point of contact can resist skewing of the parts that might otherwise enable accidental release of the clasp and catch.

In the exemplary embodiments, the first and second shell pieces form two halves of the packing. However, further shell pieces may be provided. For instance a third shell piece. Here, the shell pieces may for a third of the packaging or the shell pieces may form different proportions as might be required by the shape of the container. When further shell pieces are included, the first and second terminology refers to the shell pieces at the ends of the arrangement. That is, the third and further shell pieces are arranged between the first and second shell pieces in a series. Each shell piece is connected to adjacent shell pieces. Here, the third and any subsequent further shell pieces are connected to two adjacent shell pieces, whereas the first and second shell pieces are only connected to one adjacent shell piece thus leaving a distal edge free. Each pair of connected shell pieces are connected by a hinge. Suitably, where multiple hinges are required, each hinge is substantially parallel with each other.

In the exemplary embodiment wherein the container is a bottle, the hinge is arranged to be substantially parallel to the axis of the bottle.

In the exemplary embodiments the first and second shell pieces are moulded from a single material. For instance, it is known to form moulds from paper based materials. Thus the packaging can be made from a paper based material that might be more readily recycled as opposed to a plastics based material. As moulded shells having a uniform wall thickness each shell piece is substantially rigid. For instance, the shell pieces hold the moulded shape when removed from the mould. As will be understood, the shell pieces are moulded to have a shape that fits around the container in a snug manner. Because the exemplary shell pieces are suitably moulded, the moulded features of the shell pieces must include a draft to enable the pieces to be removed from the mould. Here, the clasp and catch are moulded features of the shell pieces. Whilst it is possible to mould hinges to connect the shell pieces in one moulding, typically, the hinges need to be formed on a flat projection. Thus, in a two piece shell, a projecting rim might be required along the part of the shells connected by the hinge. In instance where a projecting rim may be undesirable or otherwise, suitably the moulding includes a third shell piece located between respective hinges to the first and second shell pieces. Here, the third shell piece may not form a full portion of the container. For instance, the third shell piece may be a connecting strip that is configured to fit in corresponding recesses of the first and second shell pieces. Thus, when the packaging is wrapped around the container, the third shell piece fits within the overall contour of the packaging without producing a defined projecting rim.

In one exemplary embodiment, the container is a bottle for storing a liquid such as a beverage, and in particular for storing a wine or the like. Here, the shell pieces are moulded with a lower portion conforming to a portion of the main cylindrical portion of the bottle, a neck portion at an upper portion for conforming to a portion of a neck of the bottle, and a transition portion connecting the main cylindrical portion to the neck portion and that conforms to a portion of the shoulder of the bottle. The neck portion of the shell pieces may be arranged to extend partway up the bottle, for instance to leave the cork and foil or some of the foil visible. Thus, when wrapped around the bottle, the packaging leaves an aperture at the upper end through which the neck extends. However, the neck portion of the shell pieces may also extend over the cork and foil and/or the top of the cork to substantially enclose the bottle top end. In a preferred embodiment, the shell pieces are moulded to wrap at least partially over the base of the bottle. Here, the at least partial wrapping prevents the packaging from slipping off the bottle in the axial direction. Suitably, the packaging does not cover the entire base of the bottle. Thus, when the packaging is wrapped around the bottle, a bottom aperture is formed through which the bottle can at least partially extend. Here, by configuring the packaging, and therefore the shape of the shell pieces, to allow the bottle base to extend through the packaging, the bottle can provide the base upon which the bottle is stood, for instance when on a shelf or worktop.

According to a further aspect, there is therefore provided a method of packaging a container. The method comprises wrapping a first shell piece and a second, interconnected shell piece about the container. The method further comprises securing the first shell piece to the second shell piece by engaging a clasp on the first shell piece to a catch on the second shell piece. Here, the packaging forms a two-point locking feature wherein abutment between the clasp and catch forms the first-point of contact and the method comprises causing the first shell piece to abut the second shell piece to form the second-point of contact.

In the exemplary method, engaging the clasp with the catch comprise forming the first-point of contact by urging a portion of the clasp to push past a portion of the catch. This may comprise pushing the clasp over the catch by moving the clasp relative to the catch is a direction angled to a first and a second direction that corresponds to a direction of movement of the first and second shell pieces that would expand or contract a size of the packaging. Here, in relation to an exemplary embodiment wherein the container is a bottle, the clasp is pushed in a radial direction.

The clasp fits over the catch to be arranged on an outside of the catch, or at least a portion thereof. Here, the second-point of contact is formed by abutment of a distal end edge face of the first shell piece with a distal end face of the second shell piece. Here, the method preferably comprises overlapping a portion of the second shell piece on the outside of the first shell piece. Thus, the second-point of contact is formed at the transition between the second shell piece laying over, that is on top of, the first shell piece and the first shell piece laying over, that is on top of, the second shell piece.

In some exemplary embodiments, the method further comprises causing one of the first or second shell pieces to transition from being overlapped with the other shell piece to not being overlapped or being overlapped in the alternative order. Here the method comprises forming a three-point locking feature, with the first-point and second-point being as already formed and the third-point being the abutment caused at said transition. Here, the shell pieces may be moulded to have a shape wherein a portion at or near the third-point of abutment is configured to be sized smaller than the container. That is, to push into the container when the packaging is wrapped thereabout. Thus the method comprises causing the shell pieces to push into the bottle to ensure the abutment caused by the transition.

According to a further aspect, there is provided a method of moulding said packing for the container. The method comprises moulding in a single moulding a first shell piece, a second shell piece and a hinge to interconnect the two shell pieces. The method comprises moulding a clasp and a catch in to the first and second shell pieces. The second shell piece is moulded to form an extension portion that is configured to overlap the first shell piece when the packaging is wrapped around a container.

According to a further aspect there is provided a packaged container comprising a container that is wrapped with the packaging of previous aspects and or in accordance with the method of a previous aspect.

According to a further aspect there is provided a packaging for a container, wherein the packaging comprises a first shell piece interconnected to a second shell piece via a third shell piece. Each shell piece is moulded to have a generally constant wall thickness. The first shell piece is connected to the third shell piece by a first hinge. Likewise, the second shell piece is connected to the third shell piece by a second hinge. The first and second shell pieces include a recess wherein the respective hinges are formed at the bottom edge of the recess. Here, advantageously, when the packaging is wrapped around the container, the third shell piece is located within the combined recesses of the first and second shell pieces. Thus, the hinge can be arranged to lie substantially flat against the container. In contrast, if the first and second shell pieces where connected by a single hinge directly, the mould might be required to include a projecting rim due to the restraints of the moulding system.

Preferably, the first and second hinges are substantially parallel to form a double hinge separated by the third shell piece. Suitably, the third shell piece may be substantially smaller than the first and second shell pieces.

In the exemplary embodiments, the packaging includes a clasp and catch on the respective first and second shell pieces to fasten the packaging about the container. Here, abutment between the clasp and catch forms a first-point of contact, wherein a portion of the clasp fits over a portion of the catch. That is the portion of the clasp lies on the outside of the portion of the catch. Here, a second-point of contact is formed between an extension portion of the second shell piece that is configured to overlap a portion of the first shell piece. Here the second-point of contact is formed at the transition between the second shell piece overlapping the first on the outside and the first shell piece overlapping the second on the outside. The second-point of contact is formed by an abutment between distal end edges of the respective shell pieces. It will be appreciated that the first and second points of contact combine to form the two point locking feature of previous aspects. In the exemplary embodiments, the shell pieces are moulded so that when the pieces are wrapped about the container, at a location spaced from the second-point of contact, one of the shell pieces is arranged to transition from being overlapped on top of, that is on the outside of, the other to not being overlapped on top of the other. Thus, the third point of contact is formed by abutment between the distal end edges of the first and second shell pieces at the transition. Here, the third-point of contact combines with the first and second to form a three-point locking feature. Again, it will be appreciated that the three-point locking feature of previous aspects.

According to a further aspect, there is provided a method of moulding a packaging comprising moulding a first shell piece, a second shell piece, and an interconnecting third shell piece hinged to both the first shell piece and the second shell piece. The method comprises moulding the first and second shell pieces to have a three-dimensional shape wherein the third shell piece is moulded in a planar configuration and the first shell piece and second shell piece are moulded in a configuration wherein the area around the hinge connection to the third shell piece extends in a non-planar direction.

The invention includes the combination of the aspects and preferred features described except where such a combination is clearly impermissible or expressly avoided.

BRIEF DESCRIPTION OF THE SEVERAL VIEWS OF THE DRAWINGS

Embodiments and experiments illustrating the principles of the invention will now be discussed with reference to the accompanying figures in which.

DETAILED DESCRIPTION OF THE INVENTION

Aspects and embodiments will now be discussed with reference to the accompanying figures. Further aspects and embodiments will be apparent to those skilled in the art.

Figure 1:
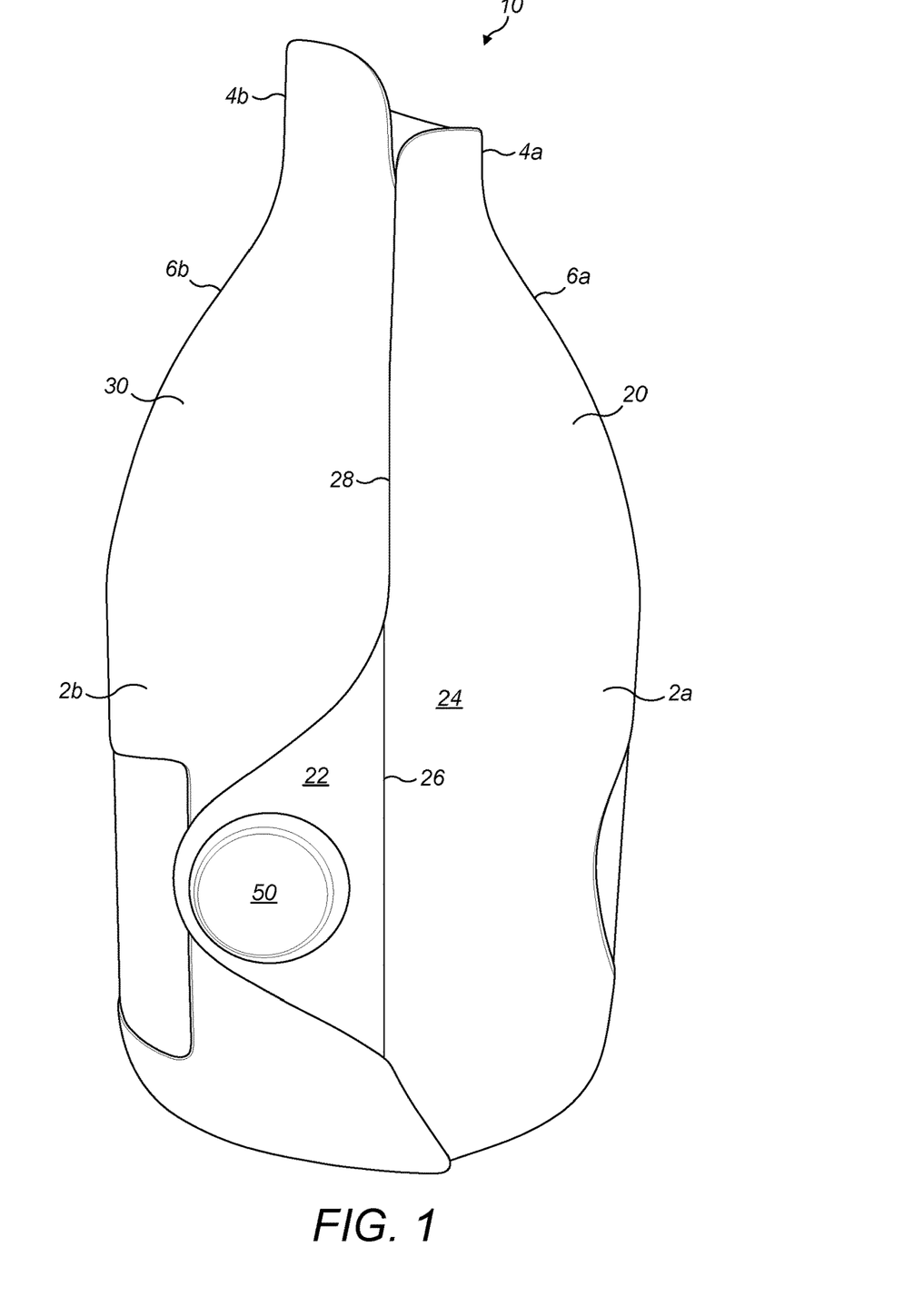
FIG. 1 is a side view of a packaging for a container according to a first embodiment and shown in a wrapped configuration.

Referring to FIG. 1 there is shown a packaging 10 for a container (not shown) according to a first exemplary embodiment. The packaging 10 comprises a first shell piece 20 and a second shell piece 30. The shell pieces are moulded to correspond to a shape of the container. Suitably, the shell pieces are moulded to have a substantially consistent thickness. The first shell piece is connected to the second shell piece at a hinge 40 (see FIG. 6). The first and second shell pieces wrap around the container and are secured together by a fastening 50. Because the shell pieces are moulded to conform to the shape of the packaging, the packaging adopts substantially the shape of the container. Thus any distinctiveness in the shape of the container is also adopted by the packaging.

The packaging 10 is shown as a moulded one-piece packaging. Here the first and second shell pieces are moulded from a single moulding along with any additional shell pieces as herein described. The moulding may comprise further and additional features as herein described or otherwise required by the specific requirements of the packaging. For instance, the moulding includes a clasp and catch as herein described. The hinge 40 is also integrally moulded. The moulding may be formed from any appropriate material. However, according to the referred embodiments, the moulding is formed from a paper based material as is known in the art. The moulding is shown in the figures as having a surface texture moulded into the surfaces of the first and second shell pieces 20, 30, for instance by etching the surfaces of the mould. Moulding a surface texture is optional and other surface patterns or textures or plain surface label areas, by way of example, are also envisaged as is required or preferred for the specific packaging. The packaging may undergo one or more post moulding processing steps to finalise the packaging. For instance, the moulding may be cut or trimmed or scored or embossed as is required. Further the packaging 10 may be printed or graphics or artwork applied as is known in the art.

As will be appreciated, the container may be adapted to fit various and numerous containers. For instance, the packaging 10 is shown as being suitable to fit a bottle. It is envisaged the bottle will contain a liquid such as a beverage or the like and in particular, a wine bottle. Indeed, the packaging is shown as being conformed to a specific shape of bottle used by a single supplier. Thus, the distinctive shape of the bottle is retained by the packaging 10 and remains recognisable. However, it will be appreciated that the packaging can be adapted in shape so that the shell pieces conform to a different design of bottle or a different size of bottle, or a container other than a bottle by simply altering the shape and design of the shell pieces. Thus the specific shape of the shell pieces is not necessarily limiting unless otherwise required herein. However, the exemplary embodiments are further described in relation to the container comprising a bottle. Here, the bottle has a main cylindrical section towards a base of the bottle. The main cylindrical section is closed by a base. The base may include an indentation. The bottle further includes a neck that is closed by a stopper such as a lid or cap or more typically for a wine bottle, a cork or the like. The neck is connected to the main cylindrical body by a shoulder. The bottle has an axis that runs from the base of the bottle to an opening in the next that is closed by the cork. The bottle is generally circular in cross section about the axis.

Thus, when the packaging 10 is wrapped around a container being a bottle, each of the first and second shell pieces 20, 30 includes a main cylindrical portion 2a, 2b, a neck portion, 4a, 4b, and a shoulder portion 6a, 6b. As shown, the packaging is formed from a first shell piece and a second shell piece. Here each shell piece covers substantially half of the bottle in the circumferential direction. Consequently, when the shell pieces are wrapped around the bottle, the ends of first and second shell pieces generally meet. Here, the packaging substantially covers the bottle protecting the liquid for exposure to sunlight and other Ultra Violet rays.

The first shell piece 20 is shown including a flap 22. The flap extends from a main part 24 of the first shell piece 20. The flap 22 and main part 24 are connected by a hinge 26. The hinge extends generally parallel to the axis of the bottle. Suitably, the hinge 26 extends parallel to a distal end edge 28 of the first shell piece. As explained, the hinge 26 can be moulded in to the packaging 10. The flap is shown carrying a clasp 52 that forms part of the fastening 50. Here, the second shell piece 30 includes a corresponding catch 54 (see FIG. 2). The clasp 52 is shown as a protrusion moulded into the first shell piece 20. The protrusion is shaped to cover the catch 54. Although the clasp 52 is shown as being circular other shapes are envisaged.

Figure 2:
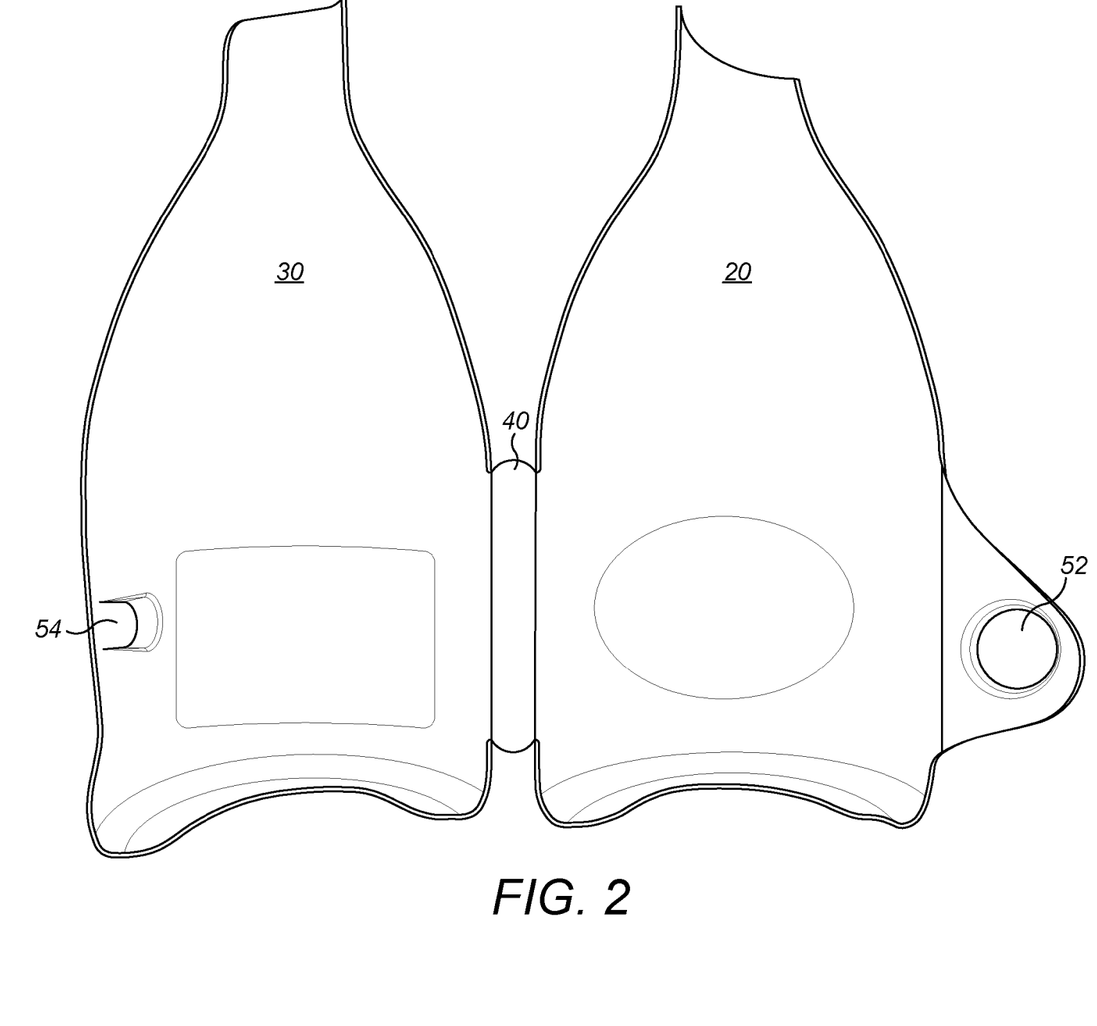
FIG. 2 is a plan view of the packaging of the first embodiment shown in an open configuration.

Referring to FIG. 2, the packaging 10 is shown in an open configuration. The hinge 40 is visible connecting the first and second shell pieces 20, 30. Flap 22 is shown extending from the first shell piece 20 and carrying the protrusion forming the clasp 52. The underside of the flap, that is the side of the flap that faces inwards towards the bottle, is shown in FIG. 2, thus the clasp is shown as a depression for receiving the catch 54. As mentioned, the second shell piece 30 carries a catch 54 that forms the fastening 50 by engaging the clasp 54. The catch 54 is shown as a depression in FIG. 2, but it will be understood that when viewed from an external face visible to the outside of the packaging, the catch 54 is a protrusion. In use, the fastening 50 can be engaged by pressing the clasp 52 over the catch 54. Here, the catch includes a nose wherein a corresponding portion of the clasp 52 is pushed over the nose to engage the fastening 50. The two portions push past each other so that once engaged, the two parts are held together unless a reverse force urging the parts back past each other is applied. For instance the fastening closes by moving the portions generally radially. That is, by folding the flap about the hinge to push the clasp 52 onto the catch 54. The nose of the catch 54 and the corresponding portion of the clasp 52 may be undercut such that when the parts pass over each other, some movement in the first and second shell pieces is tolerated whilst maintaining an engagement of the clasp and catch such that unfastening of them is resisted by the nose abutting the portion of the clasp. When fastened, abutment between the clasp 52 and catch 54 resists relative movement of the first shell piece 20 and the second shell piece 30 in a first direction that expand the packaging. For instance, the packaging would expand by the first and second shell pieces moving apart in the first direction. At the interface between the two shell pieces, the movement would be seen as movement in a first tangential direction of a point on the first shell piece moving away from a point on the second shell piece. The fastening 50 therefore resists opening of the packaging 10.

Figure 3:
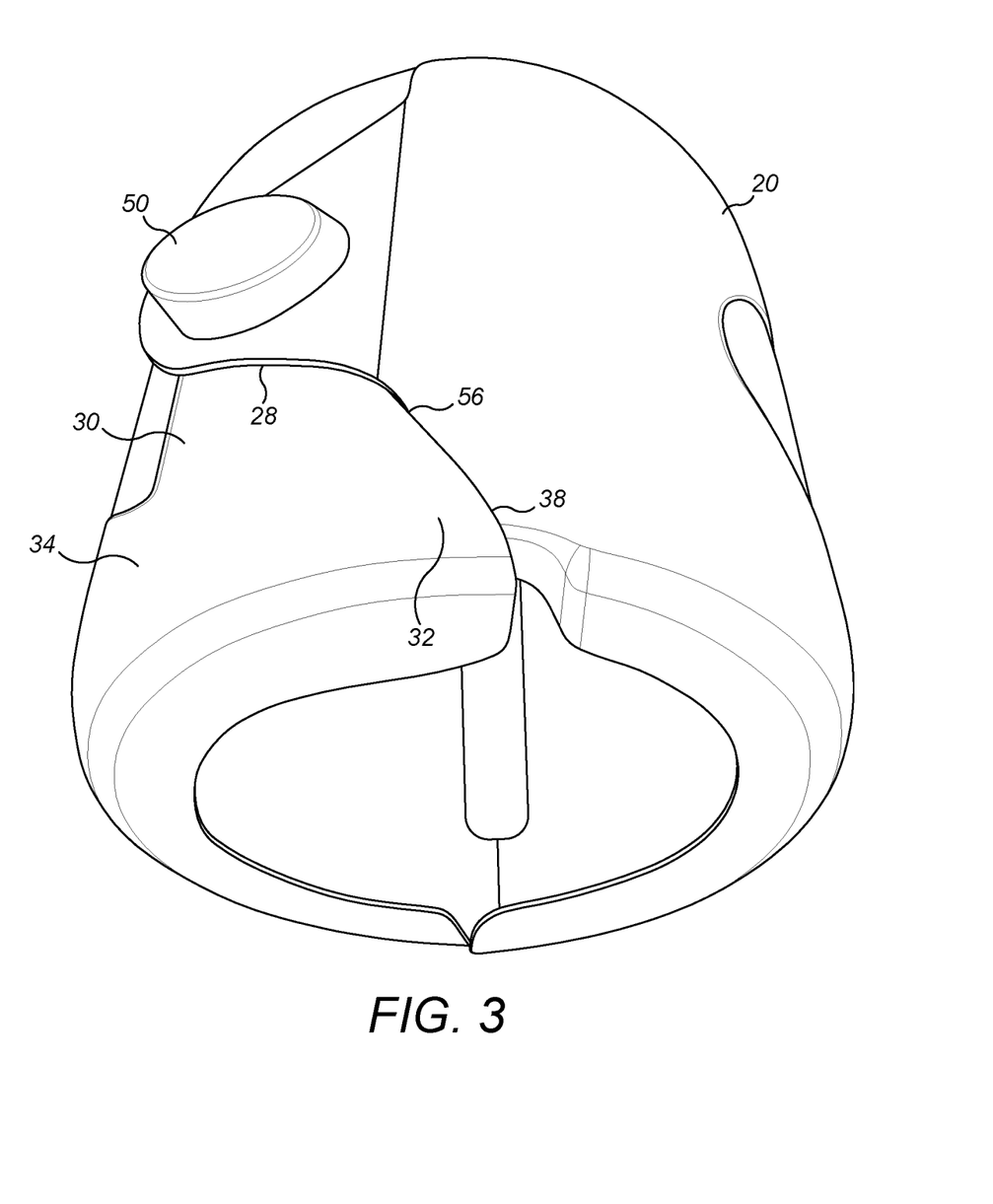
FIG. 3 is an end perspective view of the first embodiment of the packaging.

When the clasp 52 is pushed over the catch 54, there is resilient movement of the catch 54 and portion of the clasp 52 in the second direction opposed to the first direction. The second direction is a direction that would contract the packaging or, in other words, shrink the packaging into the bottle. Thus, if the first and second shell pieces 20, 30 are able to contract sufficiently, the fastening 50 can become inadvertently unfastened and the packaging can therefore dislodge from the bottle. The packaging 10 is therefore configured to have a feature that prevents contraction of the packaging. The feature is shown in FIG. 3. As shown, the feature comprises an abutment between the first shell piece and the second shell piece. The abutment is independent of the bottle and therefore the packaging can remain secured by the fastener 50 even in the event that the bottle is sized so as to allow some contraction of the packaging. The feature combined with the first abutment between the clasp 52 and catch 54 therefore forms a two-point locking feature that secures the packaging wrap securely across a range of size tolerances of the same bottle design.

As explained, the second point of contact of the two-point locking feature is an abutment between the first shell piece and the second shell piece. Suitably, the abutment is shown as being between the distal end edge 28 of the first shell piece 20 and a distal end edge 38 of the second shell piece 30. The distal end edges 28, 38 are the distal edges of the respective shell pieces that are not connected by the hinge 40 and can be seen in FIG. 2 as the distal edges facing upwards. The distal end edges are brought into abutment by causing a portion of the second shell piece 30 to overlap a portion of the first shell piece. Here, the second shell piece 30 includes an extension portion 32 that is provided to extend from the main body 34 of the second shell piece 30. The extension portion 32 is arranged to sit on top of the first shell piece. That is, to overlap the first shell piece on an outside thereof. By causing the extension portion 32 to overlay the first shell piece 20, the distal edges of the two shell pieces abut at a transition point wherein the second shell piece transitions from being overlaid on the outside of the first shell piece to being laid under, on the inside of the first shell piece. The transition is necessary to allow the clasp 52 to fit over the catch 54. The abutment of the distal end edges 28, 38 is indicated in FIG. 3 generally at reference 56.

It will be appreciated that for the shell pieces to overlap, the distal end edges 28, 38 that are formed as the periphery of the moulded packaging, should have a constant thickness with the wall thickness of the shell pieces. That is, any localised increase in wall thickness at the distal end edges caused, for instance, by the peripheral edge of the moulding having a flange would reduce the ability of the shells to overlap. Also, as discussed below, a peripheral flange around the distal end edges would inhibit the functioning of the double hinge. As mentioned above, if the moulding is produced with a peripheral flange, it is possible to use a number of post processing techniques to remove the flange, for instance, die cutting or stamping. The need for and chosen post processing technique may depend on the material used for the mould. In the preferred embodiments, the material is a paper based material. Here, pulp is used in the mould and generally, when the packaging is ready to be removed from the mould, excess pulp forms a peripheral flange. It has been found that by controlling the parameters and mould design, an in-mould wash cut can be used to trim the excess material to remove the flange. Here, as is known, a water jet is used to remove the excess material. As mentioned, by controlling the process, the cut can be made almost vertically in the mould to trim any excess flange material to leave a constant wall thickness at the distal end edges.

Figure 4:
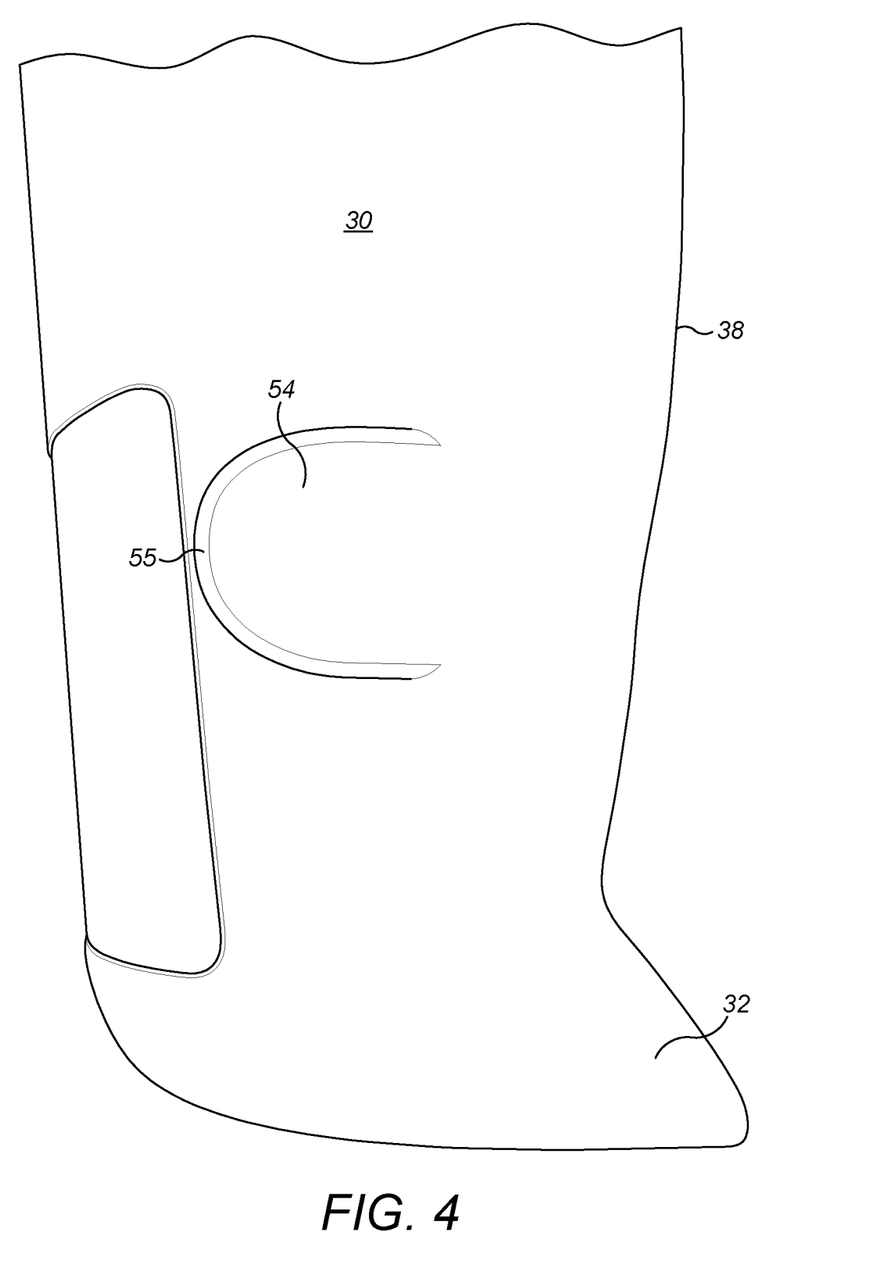
FIG. 4 is a view of a portion of packaging in accordance with the first embodiment.

FIG. 4 shows a side view of the second shell piece 30. The catch 54 is shown as a protrusion and the nose 55 is visible and faces away from distal end edge 38. Extension 32 is shown. The distal end edge 38 is configured here to cut back before the extension 32 to provide a convenient location for the transition of the overlaying portions. The extension is formed on the portion of the main cylindrical portion of the bottle. The catch is shown located around the centre or middle of the main cylindrical portion, relative to the axial direction.

Figure 5:
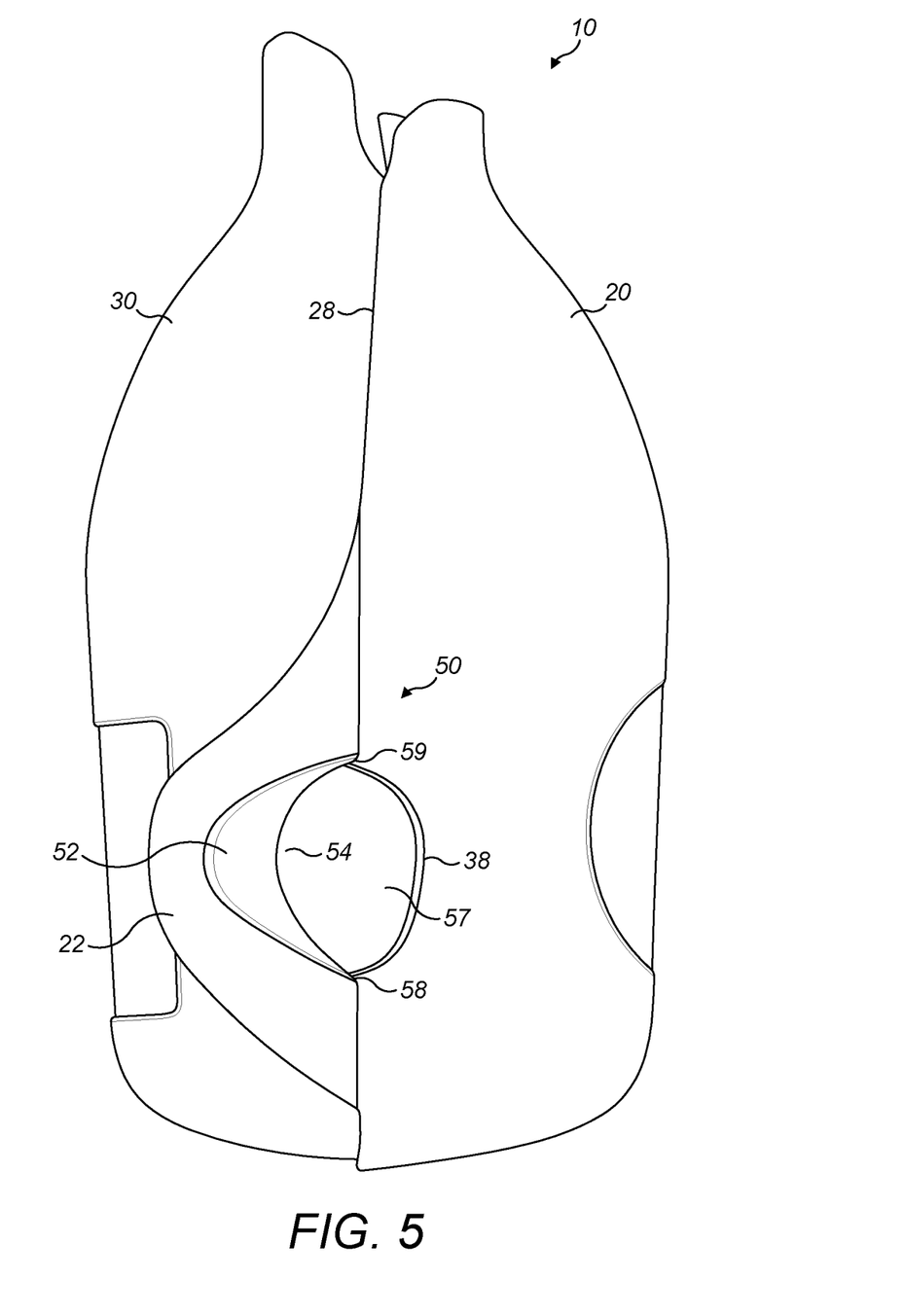
FIG. 5 is a side view of a packaging for a container according to a second embodiment and shown in a wrapped configuration.

Referring to FIG. 5 a second embodiment is shown of the packaging 10. The packaging 10 comprises a first shell piece 20 interconnected to a second shell piece 30 by a hinge 50 (not visible). The packing varies due to the design of the fastening 50. Whilst the fastening still comprises a clasp 52 formed on a flap 22 of the first shell piece 20 and a catch 54 formed on the second shell piece 30, the clasp does not entirely cover the catch 54. Rather, the clasp only covers the catch 54 at the nose region 55. The first-point of contact between the nose and the portion of the clasp 52 continues to function in the same manner as the first embodiment. However, the clasp fits over the catch whilst allowing a leading end 57 of the catch to protrude through an aperture in the clasp 52. The leading end 57 of the catch 54 is configured to form a part of the distal end edge of the second shell piece 30. Thus, the transition from the distal end edge of the second shell piece 30 from overlaying the first shell piece to laying under the first shell piece occurs at the abutment of the distal end edges at the catch. Moreover a transition and therefore abutment point is provided on both sides of the catch, where the catch extends through the aperture formed in the flap 22. The abutment points are indicated in FIG. 5 generally at reference 58 and 59.

Figure 6:
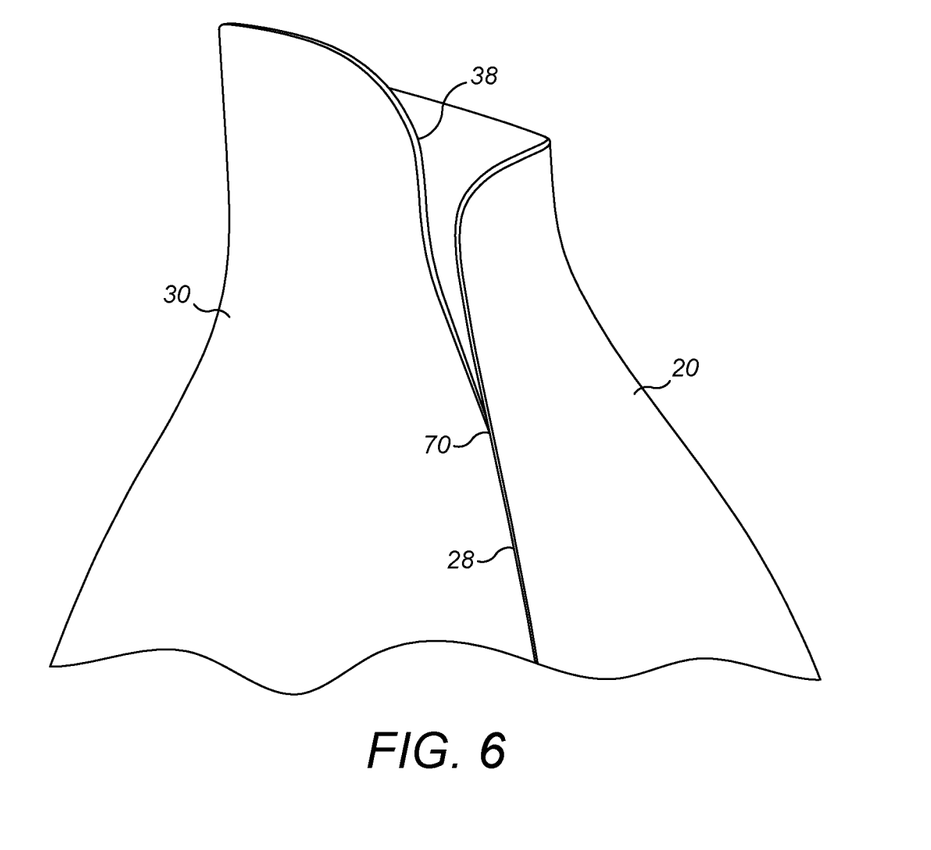
FIG. 6 is a side view of a neck area of a packaging container according to either the first embodiment or the second embodiment.

Referring to FIG. 6, the embodiments may include a third abutment point located spaced from the second abutment point and towards the neck area or shoulder area of the bottle creating a three-point locking feature. The third abutment point is formed from a transition of one of the first shell piece or the second shell piece transitioning from an overlaid arrangement wherein said shell piece is arranged on the outside of the other, to an arrangement on the other side of the transition wherein the part is not overlaid on top of the other. As shown, suitably, it is the first shell piece 20 that is overlaid on top of the second shell piece to one side of the transition. On the other side of the transition (indicated generally by reference 70), the first shell piece 20 is not arranged to overlay the other part. Here, the bottle can be used to urge the parts of the shell pieces outwards to ensure an abutment of the distal end edges at the transition. Alternatively, although not shown, the first part could include an extension to fit underneath the second part such that the distal end edge of the first shell piece 28 transitions from being on the outside of the second shell piece to being underneath the second shell piece 30.

Figure 7:
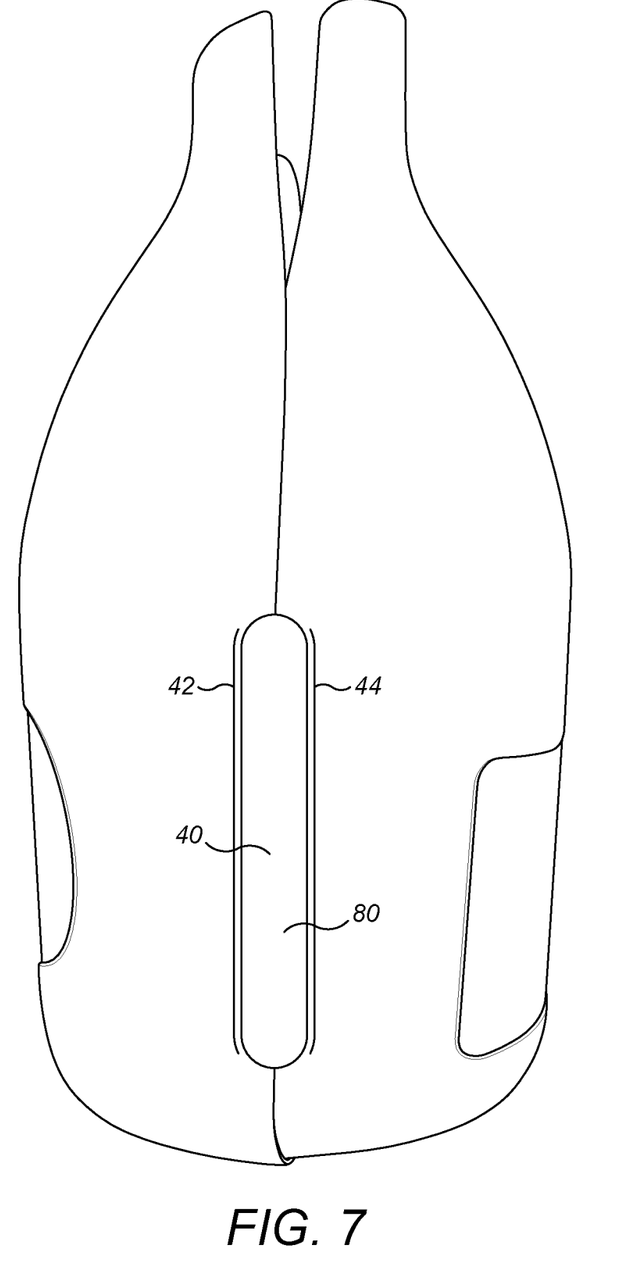
FIG. 7 is a rear view of the packaging of the first and second embodiments.

FIG. 7 shows an exemplary hinge 40 for connecting the shell pieces 20, 30. The hinge is shown as a double hinge 42, 44. Each hinge 42, 44 is generally parallel. The hinges 42, 44 are shown extending parallel to the axis of the bottle. Whilst a single hinge would suffice, the moulding process might require a rim to be formed that projects outwards from the packaging. However, by providing a double hinge, the hinge can lay substantially flat against the bottle. Here, the packaging includes a third shell piece 80. The third shell piece 80 interconnects the first and second shell pieces. Thus, the third shell piece is connected by the respective hinges 42, 44 on each side. Here, the first and second shell pieces include notches for receiving a portion each of the third shell piece 80. Thus, when wrapped around the container, as shown in FIG. 7, the third shell piece fits in the aperture formed by the combination of the notches in each of the first and second shell pieces. The double hinge may find application in other packaging or moulded parts where the hinge between two shell pieces might be beneficial to lay flat against the container.

The packaging can be moulded in the open configuration generally as shown in FIG. 2. Here the third shell piece extends in a first plane. With the hinges 42, 44 moulded in the interconnection to the first and second shell pieces. The first and second shell pieces are moulded in the open configuration wherein faces interconnecting with the hinges drop away. That is, the concave faces of the first and second shell pieces do not overlap each other, rather they are arranged on either side of the third shell piece.

The packaging herein described provides an improved packaging wherein the packaging wraps around the container or other product, to form a second skin packaging. In combination with the first and second abutment and preferably also the third abutment, the packaging's fastener can be maintained secured in an engaged configuration even when the packaging wraps an article made to a minimum manufacturing tolerance that allows some contraction of the packaging around the article.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

I claim:

1. A packaging for a container, the packaging comprising:
a first shell piece;
a second shell piece connected or interconnected to said first shell piece by a hinge;
a fastener that holds said first shell piece to said second shell piece, said fastener comprising a clasp on said first shell piece that fits over a catch on said second shell piece, said second shell piece having an extension portion that overlaps said first shell piece below the clasp and catch, so as to produce a transition point above which said first shell piece overlaps said second shell piece, and below which said second shell piece overlaps said first shell piece such that the packaging resists both contraction and expansion.

2. The packaging of claim 1, wherein said first shell piece has a flap that is hinged to a main body of said first shell piece, the clasp positioned on the flap.

3. The packaging of claim 1, wherein said first shell piece and said second shell piece are moulded to conform to a shape of the container.

4. A packaging for a container, the packaging comprising:
a first shell piece;
a second shell piece connected or interconnected to said first shell piece by a hinge;
a fastener that holds said first shell piece to said second shell piece, said fastener comprising a clasp on said first shell piece that fits over a catch on said second shell piece, said second shell piece having an extension portion that overlaps said first shell piece below the clasp and catch so as to produce a transition point above which said first shell piece overlaps said second shell piece, and below which said second shell piece overlaps said first shell piece such that the packaging resists both contraction and expansion, wherein another transition point is formed above said clasp and catch where said first shell piece transitions from being overlaid on an outside of said second shell piece to not overlaying said second shell piece above the another transition point.

5. The packaging of claim 4, wherein respective distal edges of said first shell piece and said second shell piece meet at the another transition point.

6. The packaging of claim 4, wherein the hinge is a double hinge.

7. An assembly comprising:
a packaging comprising:
a first shell piece;
a second shell piece connected or interconnected to said first shell piece by a hinge; and
a fastener that holds said first shell piece to said second shell piece, said fastener comprising a clasp on said first shell piece that fits over a catch on said second shell piece, said second shell piece having an extension portion that overlaps said first shell piece below the clasp and catch so as to produce a transition point above which said first shell piece overlaps said second shell piece, and below which said second shell piece overlaps said first shell piece such that the packaging resists both contraction and expansion; and
a container wrapped in said packaging.

8. The packaging of claim 7, wherein the clasp covers substantially all of the catch, said first shell piece and said second shell piece being moulded to conform to a shape of said container.

9. The packaging of claim 7, wherein the clasp covers substantially all of the catch, wherein another transition point is formed above said clasp and catch where said first shell piece transitions from being overlaid on an outside of said second shell piece to not overlying said second shell piece above the another transition point.

10. The packaging of claim 7, wherein said first shell piece has a flap that is hinged to a main body of said first shell piece, the clasp positioned on the flap, wherein the clasp covers substantially all of the catch, wherein said first shell piece and said second shell piece are moulded to conform to a shape of the container.

11. The packaging of claim 7, wherein another transition point is formed above said clasp and catch where said first shell piece transitions from being overlaid on an outside of said second shell piece to not overlying said second shell piece above the another transition point, said first shell piece and said second shell piece being moulded to conform to a shape of said container.

* * * * *